US010114438B2

(12) United States Patent
Sahu et al.

(10) Patent No.: US 10,114,438 B2
(45) Date of Patent: Oct. 30, 2018

(54) DYNAMIC POWER BUDGETING IN A CHASSIS

(71) Applicant: Dell Products, LP, Round Rock, TX (US)

(72) Inventors: Santosh K. Sahu, Gondola (IN); Krishna Kumar P.K., Bangalore (IN); Rama B. Bisa, Kandukur (IN); Tandava V. K. Popuri, Bangalore (IN); Roger W. Foreman, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 155 days.

(21) Appl. No.: 14/450,677

(22) Filed: Aug. 4, 2014

(65) Prior Publication Data

US 2016/0034012 A1   Feb. 4, 2016

(51) Int. Cl.
*G06F 1/32* (2006.01)
*G06F 1/26* (2006.01)

(52) U.S. Cl.
CPC ............. *G06F 1/3206* (2013.01); *G06F 1/26* (2013.01); *G06F 1/329* (2013.01); *G06F 1/3287* (2013.01); *Y02D 10/171* (2018.01); *Y02D 10/24* (2018.01)

(58) Field of Classification Search
CPC .................................................... G06F 1/3203
See application file for complete search history.

(56) References Cited

U.S. PATENT DOCUMENTS

| 7,831,843 | B2 * | 11/2010 | Brundridge ........... G06F 1/3203 307/140 |
| 8,006,112 | B2 | 8/2011 | Munjal et al. |
| 8,612,801 | B2 | 12/2013 | Weilnau, Jr. et al. |
| 2007/0300083 | A1 * | 12/2007 | Goodrum .............. G06F 1/3203 713/300 |

(Continued)

FOREIGN PATENT DOCUMENTS

WO   WO 2013/036497 A2   3/2013

OTHER PUBLICATIONS

"A Dynamic Approach to Power Budgeting," Microsoft Corporation, Intel Corporation, May 1, 2014 https://www.google.co.in/.

(Continued)

*Primary Examiner* — Kim Huynh
*Assistant Examiner* — Eric Chang
(74) *Attorney, Agent, or Firm* — Larson Newman, LLP

(57) ABSTRACT

A chassis determines a steady state power consumption of each node in the chassis based upon real-time monitoring of power consumption of the nodes. The chassis also determines a power allocation for each node based upon the steady state power consumptions for the nodes. The chassis also determines a total power allocation for the chassis based upon the steady state power consumptions for the nodes. The chassis also determines a source and amount of input power for the chassis based upon the total power allocation for the chassis. The steady state power consumption of a node may be determined by sampling the power consumption of the node during a window period, and setting the steady state (Continued)

consumption of the node to a range if the values of the samples during the window period are within the assigned range.

20 Claims, 10 Drawing Sheets

(56) References Cited

U.S. PATENT DOCUMENTS

| | | | |
|---|---|---|---|
| 2009/0077407 A1* | 3/2009 | Akimoto | G06F 1/26 713/340 |
| 2009/0193276 A1* | 7/2009 | Shetty | G06F 1/3203 713/340 |
| 2010/0037070 A1* | 2/2010 | Brumley | G06F 1/3209 713/300 |
| 2012/0137158 A1* | 5/2012 | Nelluri | G06F 1/3203 713/340 |
| 2012/0198263 A1 | 8/2012 | Berke et al. | |

OTHER PUBLICATIONS

"Intel Datacenter Manager: Energy Director," Datacenter Software Portfolio Overview, Intel DCM:SAA, Jul. 8, 2014 www.intel.com/content/www/us/en/software/intel-energy-director-product-detail.html.

"Intel Datacenter Power Management Node Manager," Datacenter Software Portfolio Overview, Intel, Jul. 21, 2014 www.intel.com/content/www/us/en/software/intel-energy-director-product-detail.html.

* cited by examiner

DYNAMIC POWER BUDGETING IN A CHASSIS

FIELD OF THE DISCLOSURE

The present disclosure relates generally to information handling systems, and more particularly to dynamic power budgeting in a chassis.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. The power requirements of a chassis may vary depending upon the workload of the components of the chassis.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
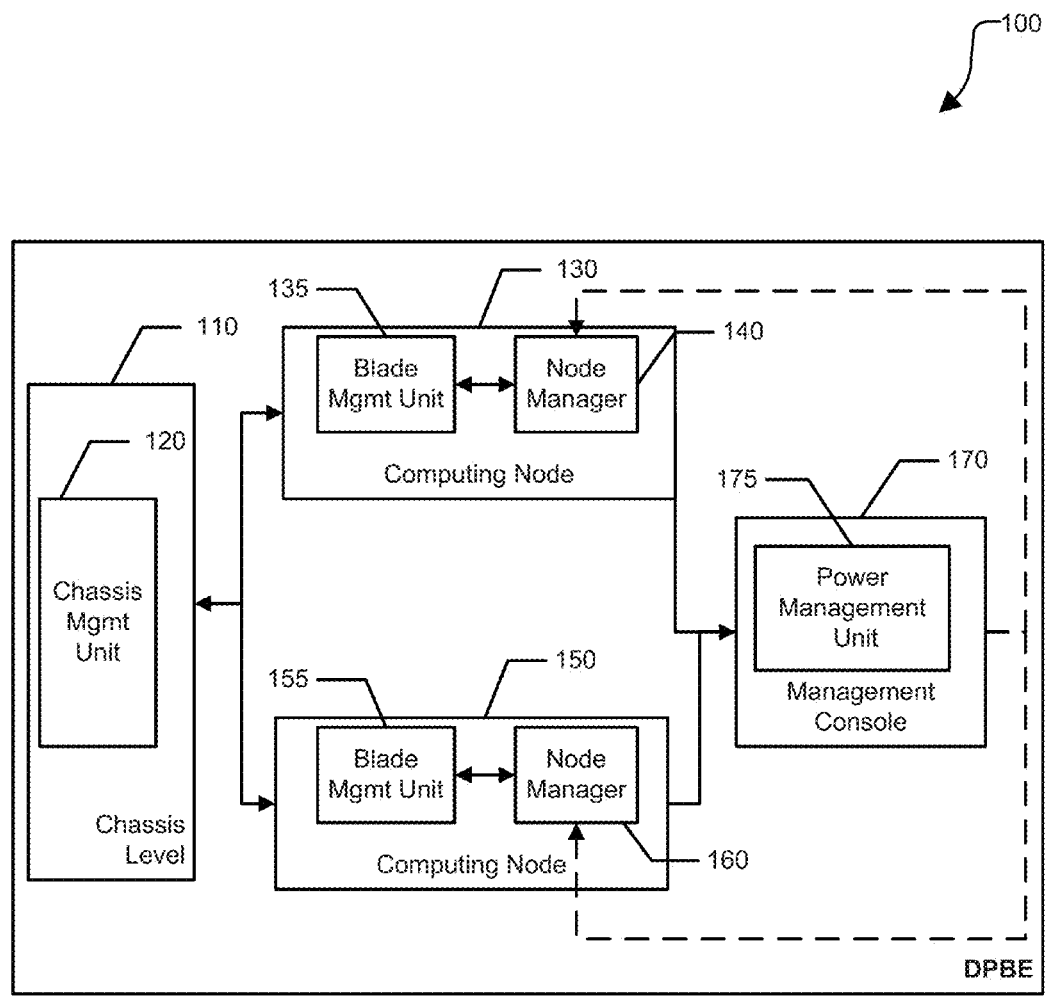
FIG. 1 is a block diagram of a dynamic power budgeting engine of an information handling system according to an embodiment of the present disclosure.

FIG. 1 illustrates a dynamic power budgeting engine (DPBE) 100 of an information handling system. For purpose of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. Information handling system can also include one or more buses operable to transmit information between the various hardware components.

DPBE 100 includes chassis level components 110, computing nodes 130 and 150, and management console 170. Chassis level components 110 includes chassis management unit 120. Computing node 130 contains blade management unit 135 and node manager 140, and computing node 150 contains blade management unit 155 and node manager 160. Management console 170 includes power management unit 175.

DPBE 100 may manage the power supply of one or more chassis. A chassis is a system of multiple information handling systems contained in common housing. The chassis may include management components. A chassis may be modular; that is, the computing nodes of the chassis may be identical or similar models.

Chassis level components 110 include components to enable the overall operation of a chassis. Chassis management unit 120 may manage the operations of a chassis, such as the power supply of the chassis. Computing nodes 130 and 150 represent two information handling systems contained in a chassis. A node is an information handling system connected to a computer network. Blade management units 135 and 155 may manage the interface between system management software and platform hardware. In some embodiments, they may consist of microcontrollers embedded in the motherboards of computing nodes 130 and 150. Node managers 140 and 160 may manage the power usage of computing nodes 130 and 150, respectively. They may, for example, report system-level as well as processor and memory subsystem power consumption, and may limit power at the system, processor, and memory levels. In other embodiments, the number of nodes in a chassis may differ from two. In some embodiments, a chassis may contain one node. In many embodiments, a chassis may contain 32 nodes.

Management console 170 may collect information for the management of a system of several chassis, display the information to administrators of the system, and transmit operating instructions to the chassis. Power management unit 175 may receive information about the power usage of nodes of the chassis and may transmit instructions to the chassis on power allocations for the nodes and on the sources of power. In some embodiments, node managers 140 and 160 may report power usage and send requests for power to management console 170, and management console 170 may set power allocations for computing nodes 130 and 150 by sending commands to node managers 140 and 160.

In many embodiments, a DPBE may operate without node managers in the nodes of a chassis. The blade management units may report directly to a management console. In some embodiments, a chassis management unit may control the power usage of the nodes of a chassis without the use of a management console. In further embodiments, a DPBE may control a single chassis rather than multiple chassis.

Figure 10:
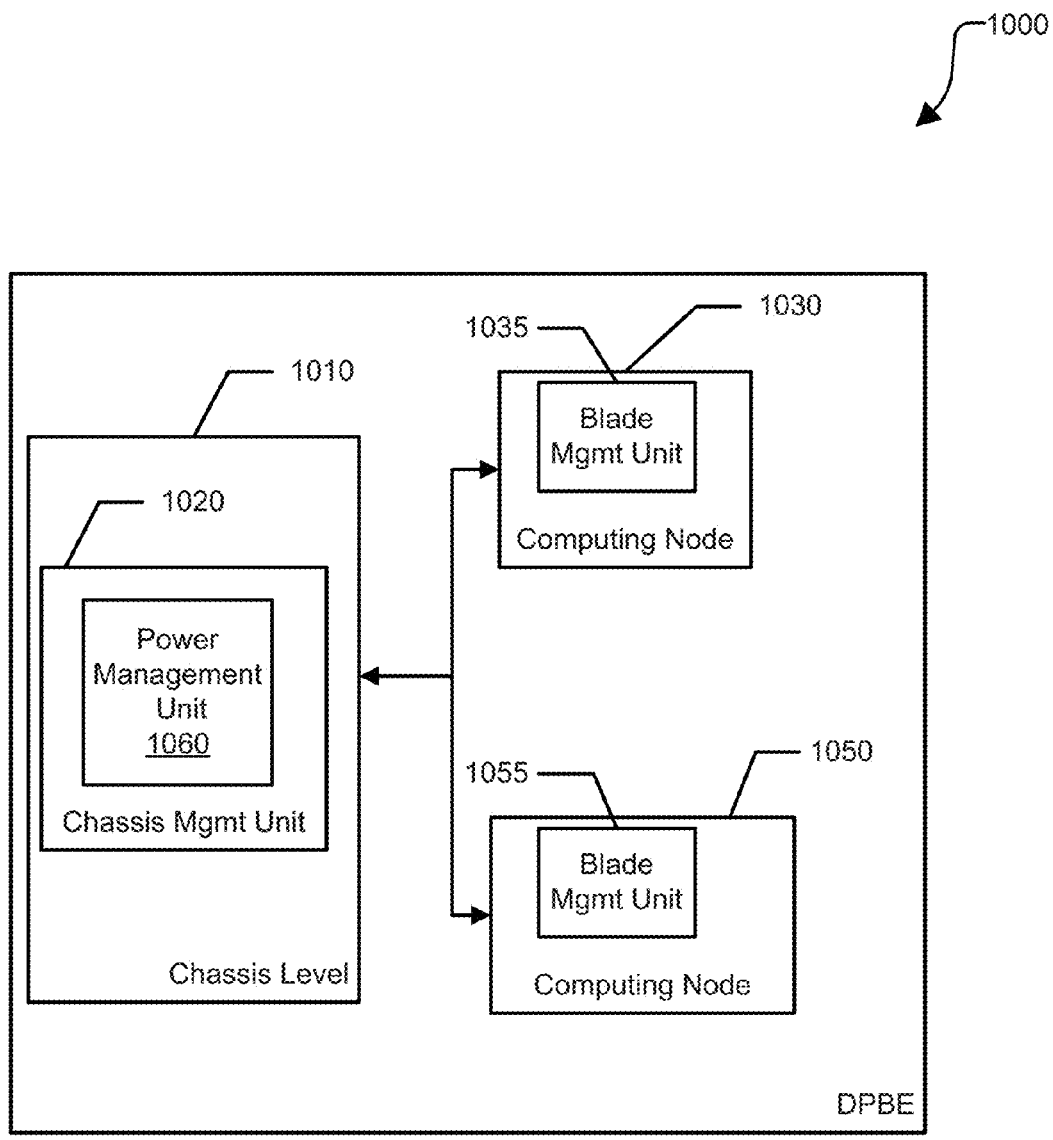
FIG. 10 is a block diagram of a dynamic power budgeting engine of a chassis according to another embodiment of the present disclosure.

FIG. 10 is a block diagram of DPBE 1000. DPBE 10000 includes chassis level components 1010 and computing nodes 1030 and 1050. Chassis level components 1010 includes chassis management unit 1020. Computing node 1030 contains blade management unit 1035 and computing node 1050 contains blade management unit 1055. DPBE 1000 may budget the power supply of a chassis.

Chassis level components 1010 include components to enable the overall operation of a chassis. Chassis management unit 1020 may manage the operations of a chassis. Chassis management unit 1020 includes power management unit 1060. Computing nodes 1030 and 1050 represent two information handling systems contained in a chassis. Blade management units 1035 and 1055 may manage the interface between system management software and platform hardware. Blade management units 1035 and 1055 may manage the power usage of computing nodes 1030 and 1050, respectively. They may, for example, report to power management unit 1060 system-level as well as processor and memory subsystem power consumption, and may limit power at the system, processor, and memory levels. In other embodiments, the number of nodes in a chassis may differ from two. In some embodiments, a chassis may contain one node. In many embodiments, a chassis may contain 32 nodes.

Chassis management unit 1020 may collect information for the management of a chassis and transmit operating instructions to the chassis. Power management unit 1060 may receive information about the power usage of nodes of the chassis and may transmit instructions to the chassis on power allocations for the nodes and on the sources of power.

In other embodiments, a DPBE may operate with node managers in the nodes of a chassis. In other embodiments, the nodes of a chassis may report on power consumption to a management console responsible for controlling the power of the nodes of several chassis.

Figure 2:
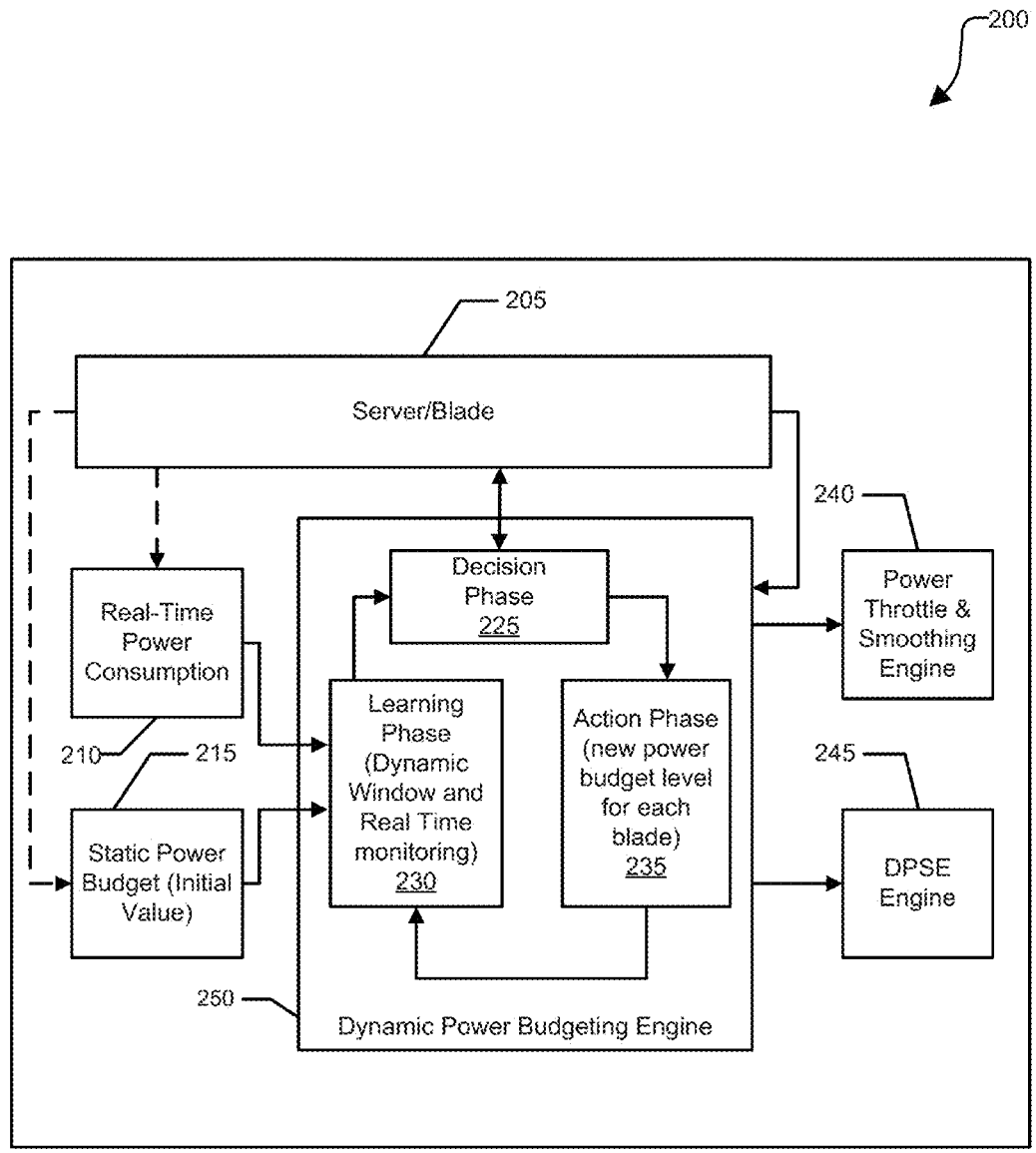
FIG. 2 is a block diagram of process flow of a dynamic power budgeting engine of an information handling system according to an embodiment of the present disclosure.

FIG. 2 is block diagram of a process flow 200 of a DPBE, such as DPBE 100 of FIG. 1. Process flow 200 may control the allocation of power to server/blade 205. Server/blade 205 may be a node such as computing node 130 or computing node 150 of FIG. 1. Process flow 200 includes three phases, decision phase 225, learning phase 230, and action phase 235, performed by DPBE 250. Inputs to process flow 200 include real-time power consumption 210 and static power budget 215. Supply of the power allocated during process flow 200 may be controlled by dynamic power supply engine 245 and power throttle and smoothing engine 240.

During learning phase 230, DPBE 250 determines a steady state power consumption level for each node present on chassis. Input to learning phase 230 includes real-time power consumption 210 and static power budget 215. Static power budget 215 may be the current allocation of power to the nodes. If there is no current allocation, the input value for a node may be a static value, such as the maximum power consumption of the node.

Figure 3:
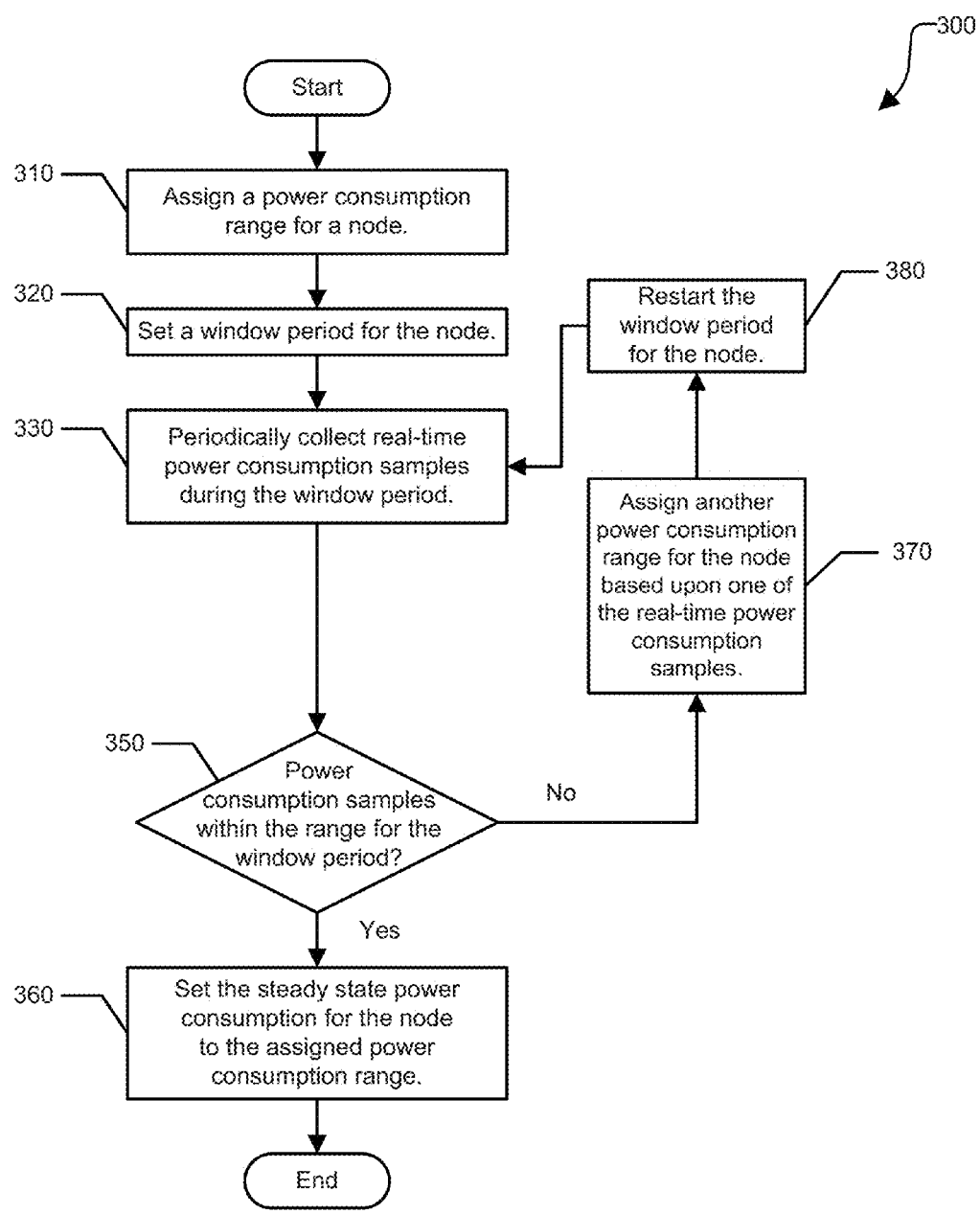
FIG. 3 is a flow diagram illustrating a method of determining a steady state power consumption range for a node of an information handling system according to an embodiment of the present disclosure.

Real-time power consumption 210 may be obtained by real-time monitoring of actual power consumption of each node in a chassis. In some embodiments, the monitoring may be performed by node managers or blade management units such as node managers 140 and 160 or blade management units 135 and 155 of FIG. 1. Turning to FIG. 3, the actions performed by a DPBE, such as DPBE 250 of FIG. 2, during the learning phase for a node are described in greater detail.

At block 310, a power consumption range is assigned for the node. DPBE 250, for example, assigned targeted budget levels for the nodes based upon static/previous steady state value. In some embodiments, the levels may be fixed ranges, the lowest range beginning at 0 power and the highest range ending at maximum power. In further embodiments, the levels are four equal ranges. In such a case, a level may be represented by a two-bit binary number. At block 320, DPBE 250 sets a window period for node. The window period may be configurable based on deployment scenarios and workload characteristics.

At block 330, the DPBE periodically collects real-time power consumption samples. As an example, the samples may be collected every two seconds. At block 350, the DPBE determines whether the values of the samples are within the assigned range. In the case where the ranges are one of four levels, the determination is whether the samples are within the assigned level. Hall of the samples are within the range for the window period, then at block 360, the steady state power consumption for the node is set to the range. For example, the steady state may be reached once consistent power consumption is reported by 150 successive samples (taken at 2 second intervals) for a configured monitoring interval of 5 minutes. In that case, the steady state power consumption is set to the currently assigned power consumption range.

If, at block 370, a sample is outside the currently assigned range, then the DPBE assigns another power consumption range for the node based upon one of the real-time power consumption samples. If, for example, the value for the current sample lies in the next-highest range, indicating an increase in power consumption by the node, then that range may be assigned to the node. At block 380, the window period is restarted for the node, and the method continues at block 330 with collecting additional samples of power consumption for the node.

Figure 4:
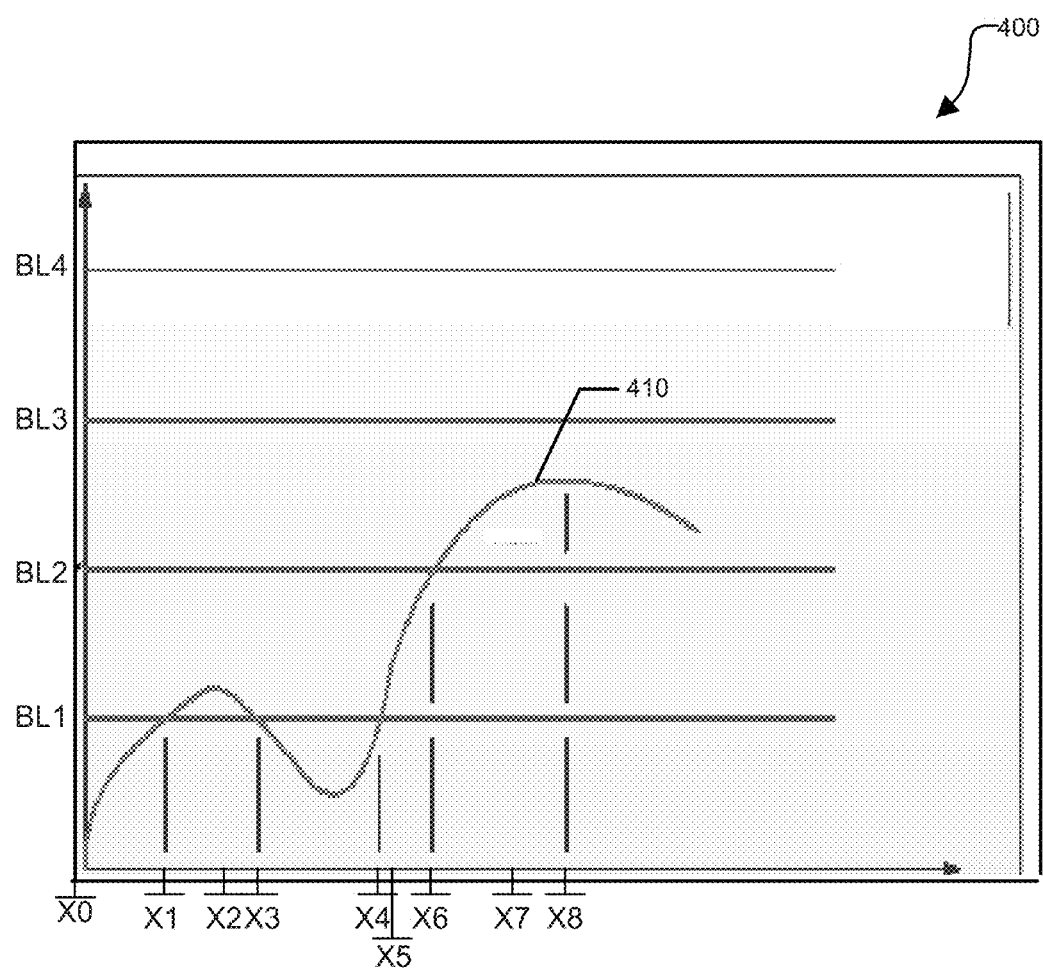
FIG. 4 is a graph illustrating a method of determining a steady state power consumption range for a node of an information handling system according to an embodiment of the present disclosure.

FIG. 4 is a graph 400 illustrating the process of FIG. 4 of determining a steady state power consumption range for a node of an information handling system according to an embodiment of the present disclosure. Curve 410 shows the values of power consumption samples for a node over time. The horizontal axis represents time, and the vertical axis represents power consumption levels. Four levels or ranges are indicated by horizontal lines, budgeted levels 1 through 4 (BL1 through BL4). In FIG. 4, level 1 may represent a range from 0% to 25% of maximum power consumption, level 2 may represent a range from 25% to 50% of maximum power consumption, level 3 may represent a range from 50% to 75% of maximum power consumption, and level 4 may represent a range from 75% to 100% of maximum power consumption. X coordinates x0 through x8 represent specific points of time. At x0, the process starts. Initially, the node was assigned BL1 and the initial value is near 0. At time the power consumption of the node reaches the limit of BL1. Accordingly, the node is reassigned the range BL2 and a new time window is started. X2 represents the time at which the first window of sampling would have expired if the consumption values for the node had stayed within the range. Since the consumption values did not stay within the assigned range, the window was restarted.

At x3, power consumption has once again shifted from one level to another, this time from level 2 to level 1. A third time window is started. At x4, the sample value once again shifts from BL1 to BL2. Further, the third time window has not completed. Its completion is marked by x5. Since the sample values did not stay within BL1 for the complete time window, a fourth time window is started, and a new range, BL2, is assigned. At x6, the value of power consumption samples increase to BL3 and the fourth time window has not completed. That would complete at x7. Accordingly, a fifth time window is started and the node is assigned the range BL3. At x8, the fifth time window expires and the power consumption sample values stayed within the assigned range for the entire fifth window period. Thus, the node is assigned level 3.

In other embodiments, the total range of power consumption may be subdivided into fewer or more than four levels. In some embodiments, the ranges may have different intervals. In a few embodiments, variable ranges may be used instead of fixed ranges. A range may, for example, be based upon an initial value or values of power consumption for a node during a window period. The range may be set to a fixed interval below and above the initial value or values, or to a fixed percentage. As an example, for an initial value of 100, a range may be set at 50 to 150. If a current sample value is outside the initial range, another range can be assigned based upon the current range. In the case of fixed intervals, the other range can be the same fixed interval. For example, if the value rises from 100 to 200, a range from 150 to 250 can be assigned.

Returning to FIG. 2, learning phase 230 is followed by decision phase 225. Input for decision phase 225 is steady state power consumption as determined by learning phase 230. Output is power allocations for the nodes of the chassis. The allocations are targeted budgeted levels or power limits of the nodes. During this phase, each node is notified about its new budget level. In addition, the allocations are input to action phase 235.

Figure 5:
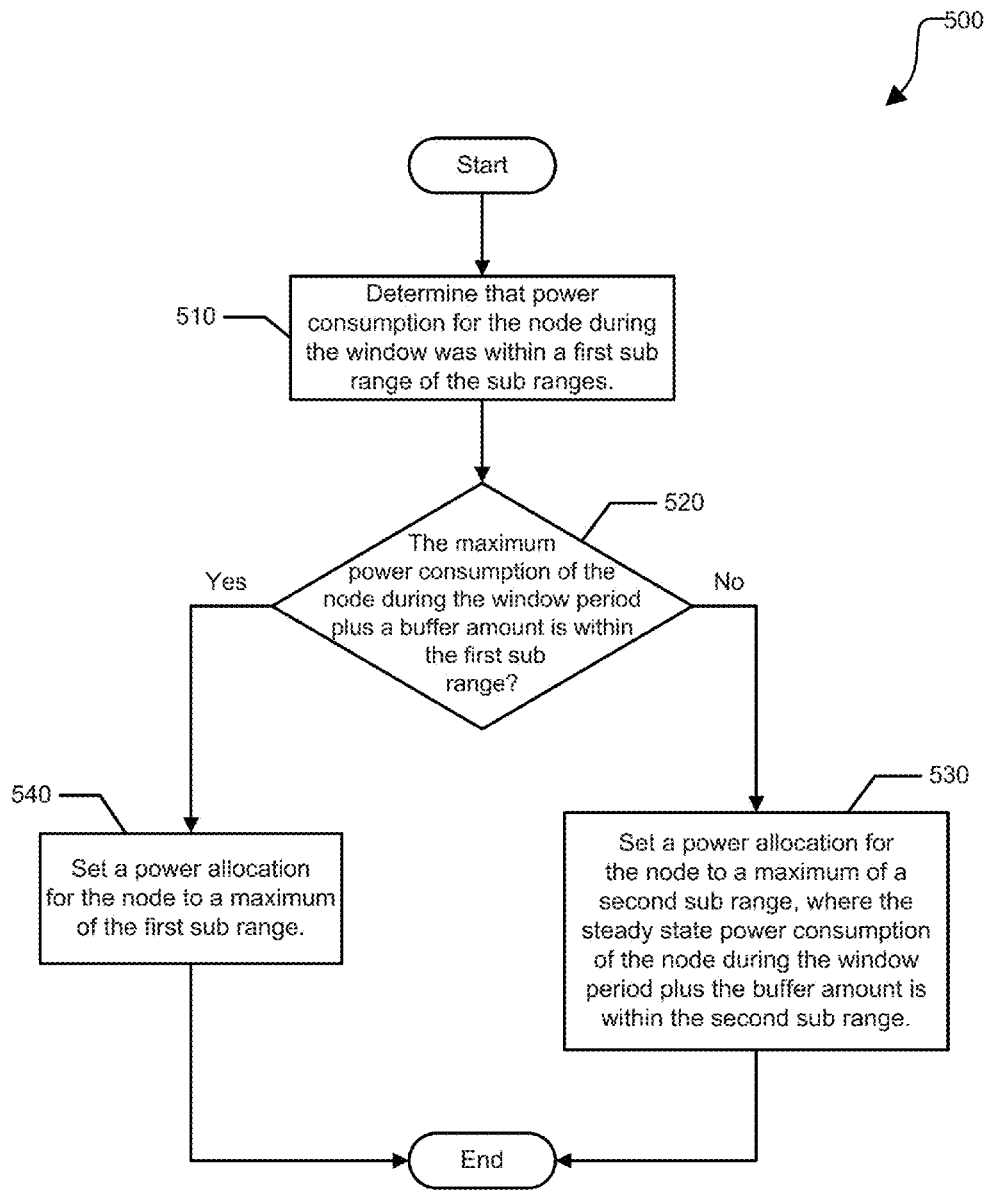
FIG. 5 is a flow diagram illustrating a method of determining a power allocation for a node of an information handling system according to an embodiment of the present disclosure.

FIG. 5 is a flow chart of a method 500 of determining a power allocation for a node, such as may be performed by a DPBE during decision phase 225. Method 500 begins at block 510 with determining that the steady state power consumption for the node is within a first sub range of power consumption. The determination of the power consumption may be the result of a process such as method 400 of FIG. 4. The sub ranges may equally divide the range of power consumption of a node. At block 520, method 500 includes checking whether the maximum power consumption of the node during the window period plus a buffer amount is within the first sub range. If so, at block 540, the power allocation of the node during the window period is set to the first sub range. If not, if the maximum power consumption of the node during the window period plus the buffer amount is within a second sub range, the power allocation of the node during the window period is set to the second sub range. As an example, the power consumption of a node during a window period is between 50 and 75, where a sub range is from 0 to 100, and the buffer amount is 20% of the maximum consumption during the window period. In this case, the maximum plus the buffer amount, 90, is still within the sub range and the sub range from 0 to 100 is set as the power allocation for the node. If however, the maximum had reached 85, the maximum plus the buffer amount, 102 would be within the sub range of 100 to 200, and that sub range is set as the power allocation for the node.

Returning to FIG. 2, decision phase 225, which determines a power allocation for each node present on the chassis, is followed by action phase 235. During action phase 235, allocated power for each node in a chassis is updated, in many cases, when the total power allocations to the nodes do not exceed the input power supply to the chassis, setting the new power budget levels for the nodes consists of updating allocated power for each server/blade with its targeted budget value. At times, however, such as because of the buffer amounts, the targeted budget values may exceed the input power supply. For example, although the chassis input power supply was currently handling the power consumption of the blades, it may not have the capacity to handle the budgeted amounts, which are higher. In that case, the new power allocations for the nodes of a chassis may be lower than the targeted budget values.

In addition, during action phase 235, the total power allocations for the chassis are determined and may be optimized, and the total input power available for future allocation to the chassis is determined and may be optimized. As an example, more nodes may be powered up if the current power supply exceeds the currently budgeted load. Further, the allocations of some nodes may be increased if more power is available than budgeted. In addition, if the power supply to the chassis is more than needed, one or more PSUs may be placed in standby mode.

If, on the other hand, the current input supply is insufficient to handle the targeted budget values, during action phase 235, the input supply may be increased. As an example, PSUs currently on standby may be activated. Further, additional PSUs may be connected to the chassis.

In some embodiments, the phases of FIG. 2 may be performed in cycles. In further embodiments, a DPBE may execute a closed-loop algorithm. A new cycle of the three phases may be executed after the completion of a previous cycle. In these embodiments, the allocations determined during a current cycle may be input to the learning phase for the next cycle. In some embodiments, the cycles may be executed continuously, with a new learning phase beginning at the end of an action phase, in other embodiments, there may be an interval between the end of a set of the three phases and the start of the next set.

Dynamic power supply engagement engine (DPSE) 245 may manage the PSUs supplying a chassis to make available the power required by the power allocations produced by DPBE 250. DPSE 245 may, for example, place the PSUs on standby if they are not needed to handle the currently budgeted load. Similarly, if the current allocation exceeds the current power, DPSE may increase the power production of some PSUs or activate additional PSUs.

Figure 6A:
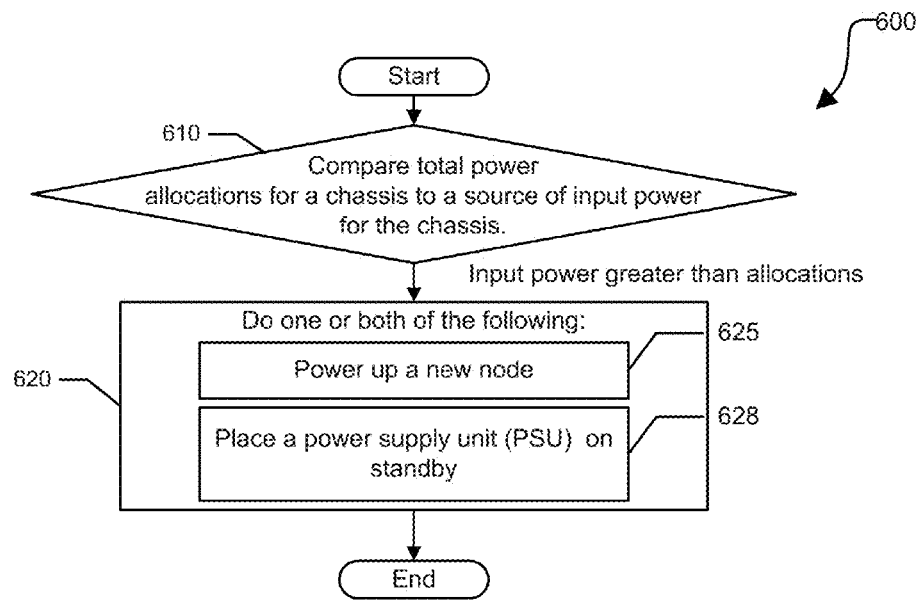
FIG. 6A is a flow diagram illustrating a method of utilizing a power supply for a chassis according to an embodiment of the present disclosure.

FIG. 6A is a flowchart of a method 600 of determining the total power allocations for a chassis. At block 610, the total power allocations for a chassis are compared to a source of input power for the chassis. If the input power exceeds the allocations, then at block 620 one or more actions may be performed to take advantage of the excess capacity. At block 625, a new node may be powered up. At block 628, a PSU may be placed on standby.

Returning to FIG. 2, server/blade 205 may notify DPBE 250 of blade events, in which the power consumption of server/blade 205 exceeds its allocated power level/sub-range. If sufficient input power is available to serve the new demand, DPBE 250 may update the budgeted power limit for the blade and initiate a fresh learning phase. If not, DPBE 250 may initiate self-healing and may notify power throttle and smoothing engine 240 of an over-commit situation. Power throttle and smoothing engine 240 may engage in throttling and smoothing based on blade priority. It may, for example, cut down on the power supply allocations of blades with lower priorities and preserve the allocations of blades with higher priorities. A throttling process is responsible for regulating the rate at which application processing is conducted. Smoothing may involve attempting to reduce the change in power available to the blades.

Figure 6B:
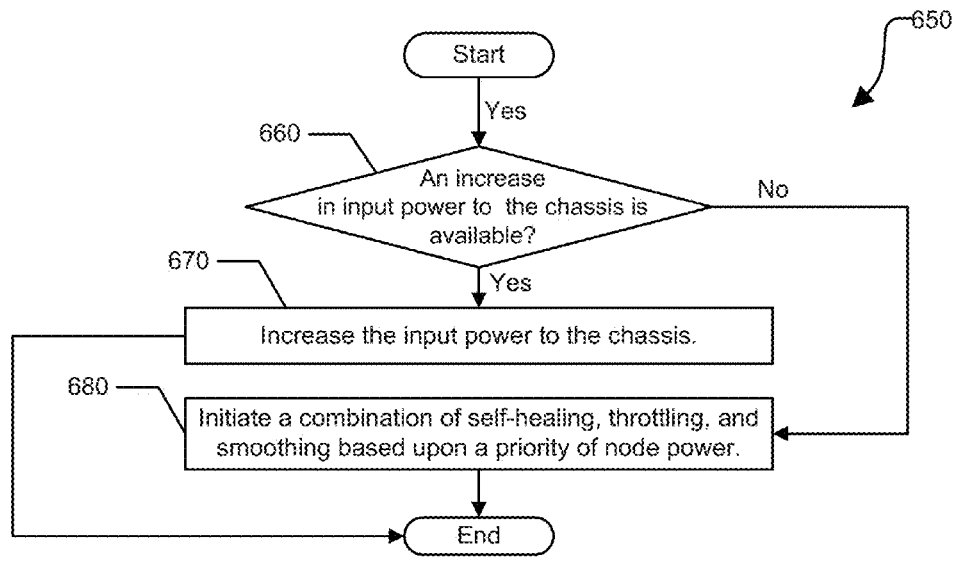
FIG. 6B is a flow diagram illustrating a method of supplying power to a chassis when power consumption of a node of the chassis exceeds its allocation according to an embodiment of the present disclosure.

FIG. 6B is a flowchart of a method 650 of supplying power to a chassis when power consumption of a node of the chassis exceeds its allocation. At block 660, the chassis checks whether an increase in input power is available to meet the power consumption needs of its components. If yes, at block 670, the input power to the chassis is increased to satisfy its needs. PSUs may be activated from standby mode or additional PSUs may be connected to the chassis. 11 not, at block 680, a combination of self-healing, throttling, and smoothing is initiated based upon a priority of node power.

Figure 7:
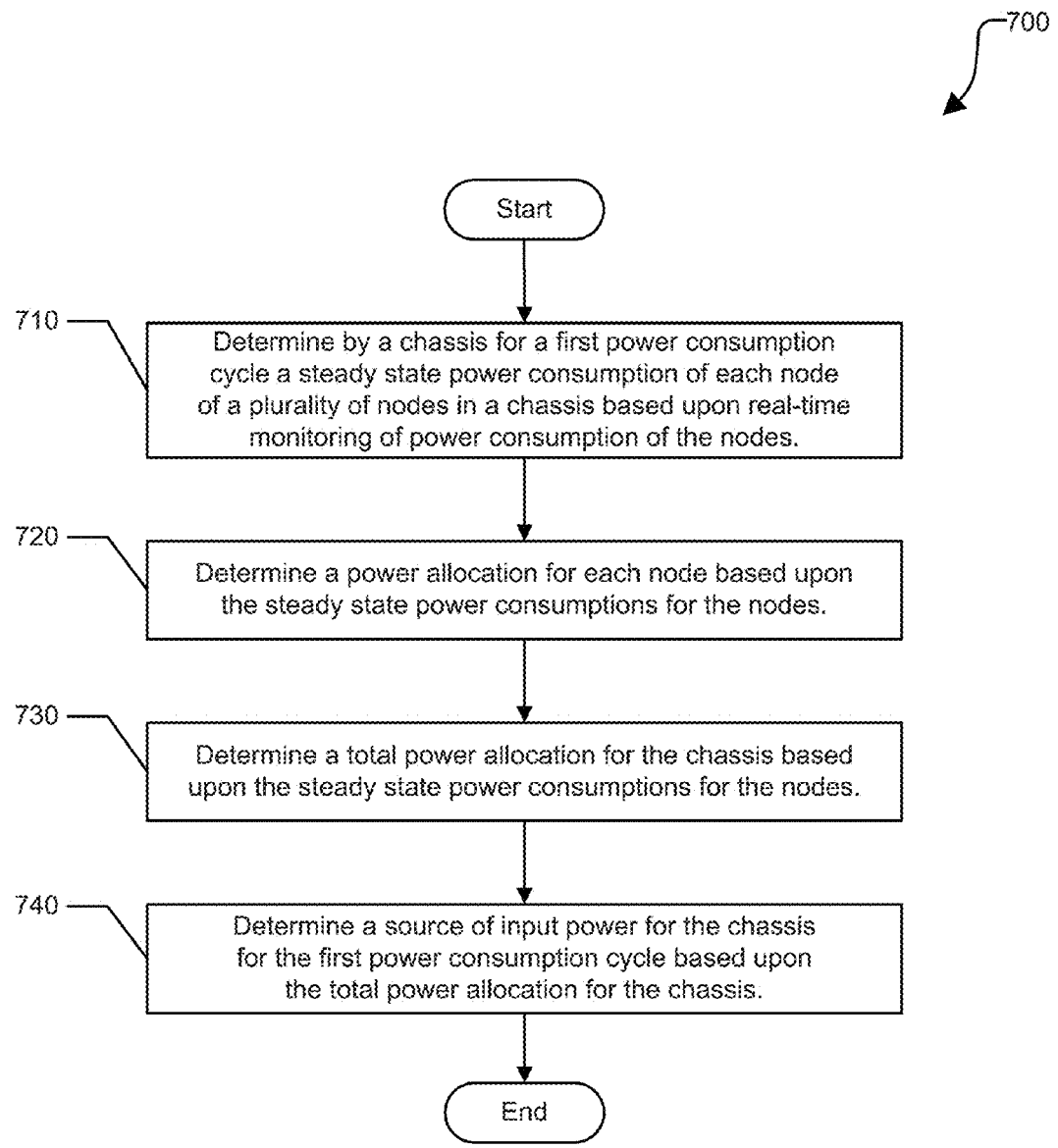
FIG. 7 is a flow diagram illustrating a method of allocating power to the components of a chassis according to an embodiment of the present disclosure.

FIG. 7 is a flow diagram of a method 700 of allocating power to the nodes of a chassis. The method may be performed during learning phase 230, decision phase 225, and action phase 235 of FIG. 2. At block 710, a chassis determines a steady state power consumption of each node of a plurality of nodes in the chassis based upon real-time monitoring of power consumption of the nodes for a first power consumption cycle. The chassis may measure samples of power consumption for each node during a window period. If the samples during the period are within a range of power consumption, the chassis may determine that range as the steady state power consumption for the node. At block 720, the chassis determines a power allocation for each node based upon the steady state power consumptions for the nodes. In one embodiment, the chassis may initially allocate to each node an allocation equal to the upper limit of the range of steady state power consumption of the node, if the maximum consumption of the node during the window period was within a buffer amount of the upper limit, and an allocation equal to the upper limit of the next range, otherwise. The buffer amount may, for example, be 20% of the maximum consumption or 20% of the upper limit. If the input power to the chassis is sufficient to supply the initial allocations, the initial power allocation for the nodes may be used as the allocations to the nodes. Otherwise, if the input power to the chassis is not sufficient to supply the initial allocations, the allocations for one or more of the nodes may be reduced.

At block 730, the chassis determines a total power allocation for the chassis based upon the steady state power consumptions for the nodes. The total power allocation may be the sums of the allocations determined in block 720. At block 740, the chassis determines a source of input power for the chassis for the first power consumption cycle based upon the total power allocation for the chassis. If the available power is more than needed, for example, the chassis may place one or more PSUs on standby. If, on the other hand, more power is needed, the chassis may place one or more additional PSUs in operation.

Performance of the method of FIG. 7 may enable better usage of power on a chassis. It may budget power to nodes based upon actual usage rather than maximum usage. Accordingly, the power budgeting may be dynamic rather than static. In particular, budgeting by actual usage may enable a chassis to power up additional blades. Further, a DPSE may operate more effectively in supplying power by receiving more accurate data about the total power allocated to a chassis. Further, executing the method may increase the life span of installed PSUs on chassis. They may save wear and tear by being placed on standby more often. In addition, violent fluctuations in the power demands put upon them may be reduced by the method of handling blade events. The automatic real-time monitoring may reduce human error, and a dependency on Datacenter/IT managers to constantly monitor and set accurate budgeted power limits for the servers. Further, the method may be independent of Node Managers such as Intel Node Manager and may be applicable to all enterprise server platforms including x86, AMD, and ARM based processor platforms.

Figure 8:
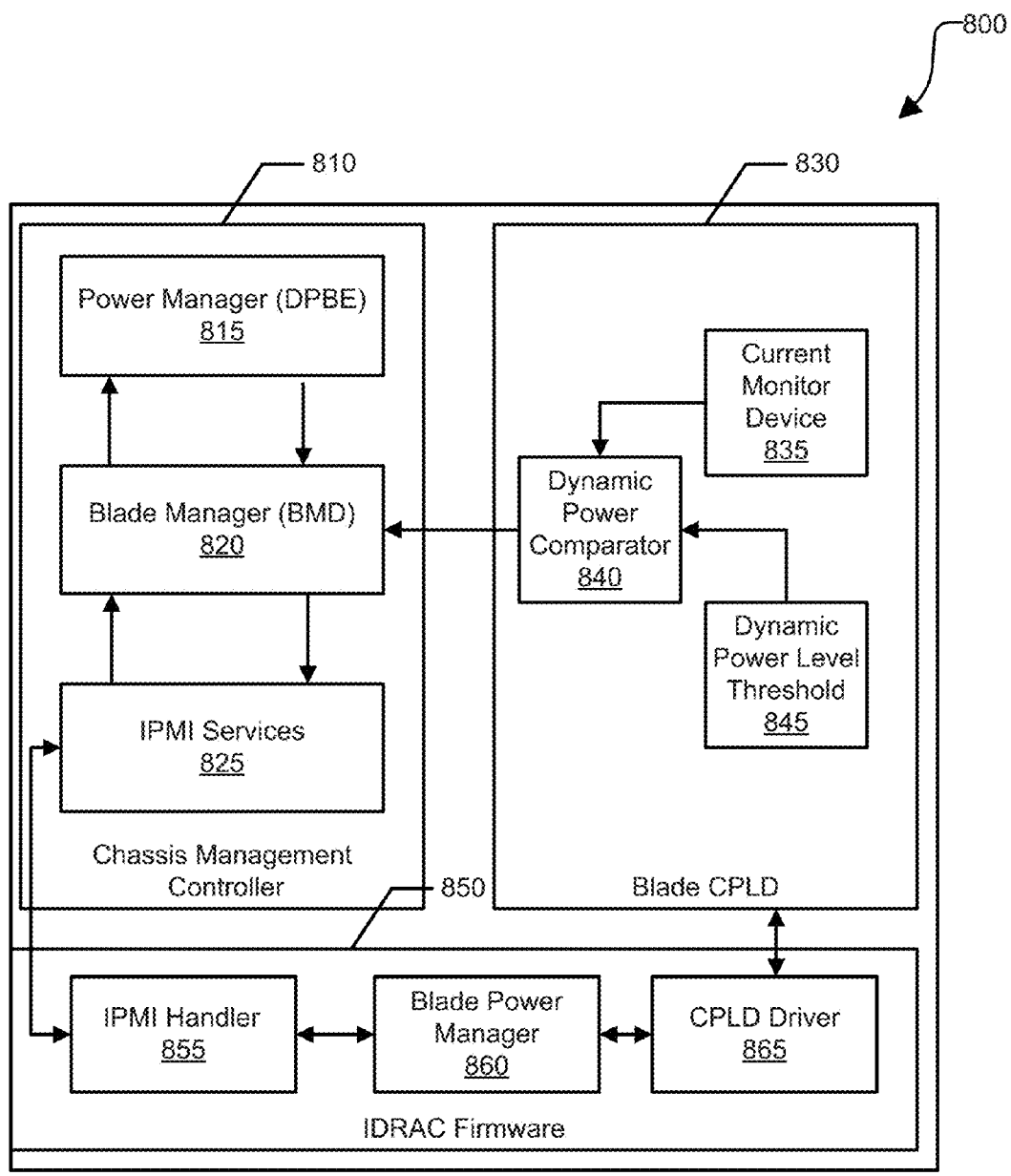
FIG. 8 is a block diagram illustrating components of a chassis to remedy power consumption of a node of the chassis exceeding its allocation according to an embodiment of the present disclosure.

FIG. 8 is a block diagram illustrating components 800 of a chassis to modify power supply to the chassis when power consumption of a node of the chassis exceeds its allocation. FIG. 8 includes chassis management controller 810, blade CPLD 830, and IDRAC firmware 850. Chassis management controller 810 includes power manager 815, blade manager 820, and IPMI services 825. Chassis management controller 810 may control the operation of a chassis, including the power supply. Power manager 815 may determine power budgets for nodes of a chassis, such as DPBE 250 of FIG. 2. Blade manager 820 may manage the interface between system management software and platform hardware, such as blade management unit 135 of FIG. 1. IPMI services 825 may receive and transmit messages about the operation of the chassis pursuant to Intelligent Platform Management Interface protocol. IDRAC firmware 850 includes IPMI handler 855, blade power manager 860, and CPLD driver 865. IDRAC firmware 850 is firmware of an iDRAC, an integrated Dell Remote Access Controller. An iDRAC is an interface card which provides remote management services to servers. IPMI handler 855 may receive and transmit message to chassis management controller pursuant to the IPMI protocol. Blade power manager 860 may manage the power of blades. CPLD driver 865 is a driver for blade complex programmable logic device (CPLD) 830.

CPLD 830 includes current monitor device 835, dynamic power comparator 840, and dynamic power level threshold 845. CPLD 830 may act as a controller for powering up and powering down a node of a chassis. Current monitor device 835 may measure current power consumption of a node of a blade of a chassis. Dynamic power level threshold 845 may store the current value of power budgeted to the blade by a DPBE. Dynamic power comparator 840 may compare the current power consumption and the budgeted amount. In case the current consumption exceeds the budgeted amount, dynamic power comparator 840 reports the over-budget consumption to BMD 820. This report may be propagated to power manager 815 and to blade power manager 860. These components may take corrective action, such as reducing the power consumption of the blade and increasing the source of power to the blade.

Figure 9:
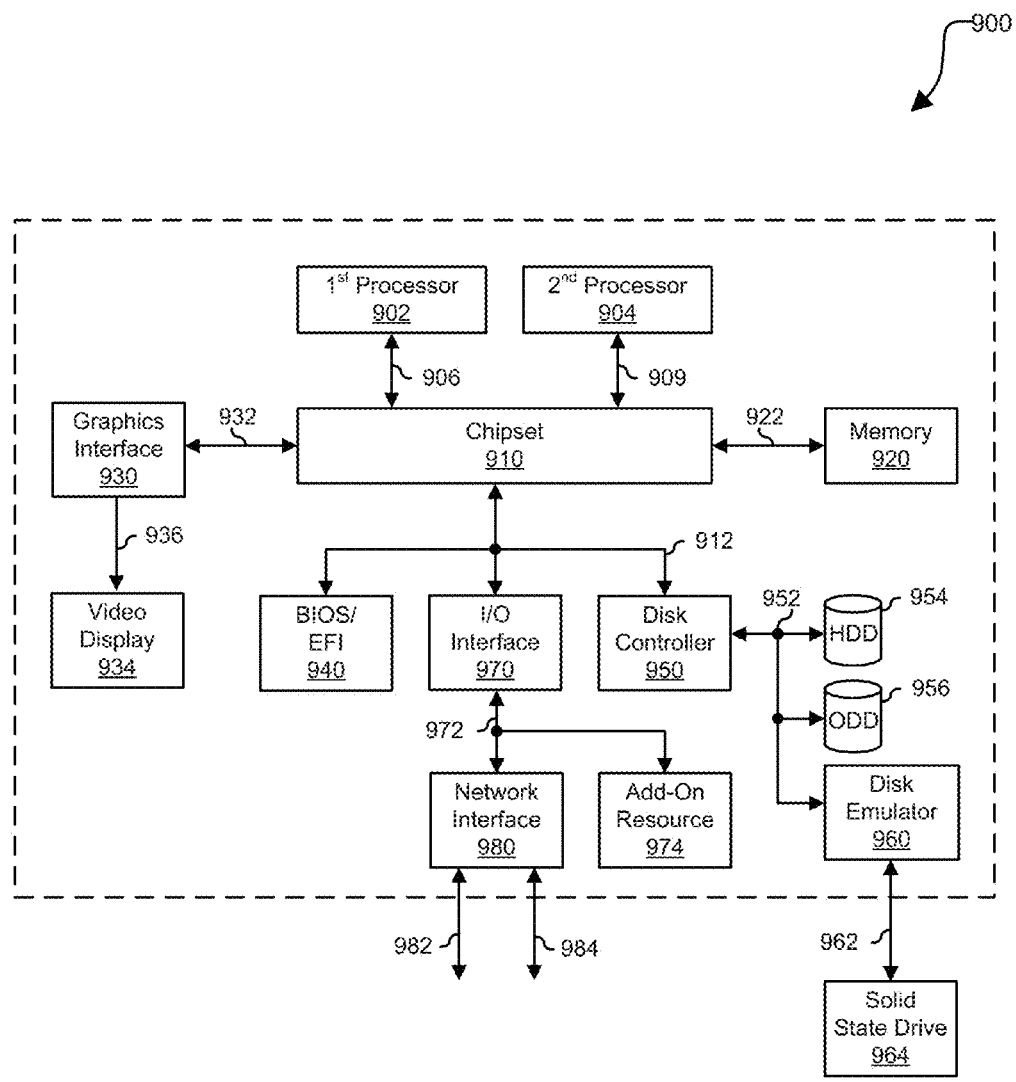
FIG. 9 is a block diagram illustrating an information handling system according to an embodiment of the present disclosure.

FIG. 9 illustrates a generalized embodiment of information handling system 900. Information handling system 900 can include devices or modules that embody one or more of the devices or modules described above, and operates to perform one or more of the methods described above. Information handling system 900 includes processors 902 and 904, a chipset 910, a memory 920, a graphics interface 930, include a basic input and output system/extensible firmware interface (BIOS/EFI) module 940, a disk controller 950, a disk emulator 960, an input/output (I/O) interface 970, and a network interface 980. Processor 902 is connected to chipset 910 via processor interface 906, and processor 904 is connected to chipset 910 via processor interface 908. Memory 920 is connected to chipset 910 via a memory bus 922. Graphics interface 930 is connected to chipset 910 via a graphics interface 932, and provides a video display output 936 to a video display 934. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high-speed PO-Express (PCIe) interface, another industry standard or proprietary communication interface, or a combination thereof. Chipset 910 can also include one or more other I/O interfaces, including an industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 940 includes BIOS/EFI code operable to detect resources within information handling system 900, to provide drivers for the resources, initialize the resources, and access the resources. BIOS/EFI module 940 includes code that operates to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 964 to be connected to information handling system 900 via an external interface 962. An example of external interface 962 includes a USB interface, an IEEE 9194 (Firewire) interface, a proprietary interface, or a combination thereof. Alternatively, solid-state drive 964 can be disposed within information handling system 900.

I/O interface 970 includes a peripheral interface 972 that connects the I/O interface to an add-on resource 974 and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as chipset 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof. In some embodiments, an information handling system, such as a node on a chassis, may share network resources with other information handling systems, such as other nodes on the chassis.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    determining, by a chassis controller, that no allocation of electrical power is allocated to a motherboard of a plurality of motherboards installed in a chassis during a learning phase;
    identifying, by the chassis controller during the learning phase, a maximum electrical power consumption associated with the motherboard lacking the allocation of the electrical power;
    assigning, by the chassis controller, a range of the electrical power to each one of the motherboards, the range of the electrical power based on the maximum electrical power consumption associated with the motherboard lacking the allocation of the electrical power during the learning phase;
    comparing, by the chassis controller, samples of the electrical power periodically consumed by the each one of the motherboards to the range of the electrical power assigned to the each one of the motherboards;
    confirming, by the chassis controller, the range of the electrical power assigned to a corresponding one of the motherboards in response to all the samples having values lying within the range of the electrical power;
    assigning, by the chassis controller, a different range of the electrical power to the corresponding one of the motherboards in response to any of the samples having a value lying outside the range of the electrical power; and
    dynamically managing, by the chassis controller, a plurality of power supply units based on ranges of the electrical power assigned to the motherboards.

2. The method of claim 1, further comprising assigning a binary value to the range of the electrical power assigned to the corresponding one of the motherboards.

3. The method of claim 2, wherein assigning the binary value comprises assigning two-bits to the binary value.

4. The method of claim 2, wherein a duration of periodicity is configurable.

5. The method of claim 1, further comprising retrieving the different range in response to the any of the samples having the value lying outside the range of the electrical power.

6. The method of claim 1, further comprising assigning a next range of the electrical power as the different range in response to the any of the samples having the value lying outside the range of the electrical power.

7. The method of claim 1, further comprising restarting sampling of the samples in response to the any of the samples having the value lying outside the range of the electrical power.

8. The method of claim 1, further comprising restarting sampling of the samples in response to assigning the different range of the electrical power to the corresponding one of the motherboards.

9. The method of claim 2, further comprising determining that a steady state electrical power consumption associated with all the motherboards exceeds an input power generated by a power supply.

10. The method of claim 1, further comprising:
determining the maximum electrical power consumption associated with the samples exceeds the range of the electrical power; and
assigning a higher range as the different range.

11. The method of claim 10, further comprising increasing an input power to the chassis in response to the higher range.

12. The method of claim 10, further comprising determining that a steady state electrical power consumption associated with all the motherboards exceeds an input power generated by a power supply.

13. An information handling system comprising:
a first chassis;
a chassis power manager;
a plurality of motherboards installed within the first chassis; and
a plurality of power supply units (PSUs) to supply electrical power to the motherboards in the plurality of the motherboards, wherein the chassis power manager executes code that causes the chassis power manager to perform operations, the operations including:
determining, during a learning phase, that no allocation of electrical power is allocated to a motherboard of a plurality of motherboards installed in a chassis;
determining a maximum electrical power consumption associated with the motherboard lacking the allocation of the electrical power;
assigning a range of the electrical power to each one of the motherboards, the range of the electrical power based on the maximum electrical power consumption associated with the motherboard lacking the allocation of the electrical power during the learning phase;
comparing samples of the electrical power periodically consumed by the each one of the motherboards to the range of the electrical power assigned to the each one of the motherboards;
confirming the range of the electrical power assigned to a corresponding one of the motherboards in response to all the samples having values lying within the range of the electrical power;
assigning a higher range of the electrical power to the corresponding one of the motherboards in response to any of the samples having a value lying outside the range of the electrical power;
determining a total power allocation associated with the first chassis based upon the maximum power consumption for all the motherboards installed in the first chassis; and
determining a source of input power associated with the first chassis from the power supply units based upon the total power allocation.

14. The information handling system of claim 13, wherein the operations further comprise placing a power supply unit of the power supply units in a standby mode of operation in response to the total power allocation.

15. The information handling system of claim 13, further comprising:
determining the total power allocation exceeds a budgeted power; and
activating an additional power supply unit of the power supply units to increase the electrical power supplied to the motherboards.

16. The information handling system of claim 13, wherein the operations further comprise comparing the total power allocation to a budgeted power.

17. The information handling system of claim 13, wherein the operations further comprise determining an excess capacity based on a comparison of the total power allocation to a budgeted power.

18. A chassis manager, comprising:
a processor; and
a memory device storing code that when executed causes the processor to perform operations, the operations including:
determining, during a learning phase, that no allocation of electrical power is allocated to a motherboard of a plurality of motherboards installed in a chassis;
determining a maximum electrical power consumption of the motherboard lacking the allocation of the electrical power;
assigning a range of the electrical power to each one of the motherboards, the range of the electrical power based on the maximum electrical power consumption determined during the learning phase;
comparing samples of the electrical power periodically consumed to the range of the electrical power assigned to the each one of the motherboards;
confirming the range of the electrical power assigned to a corresponding one of the motherboards in response to all the samples having values lying within the range of the electrical power;
assigning a different range of the electrical power to the corresponding one of the motherboards in response to any of the samples having a value lying outside the range of the electrical power; and
dynamically managing a plurality of power supply units based on ranges of the electrical power assigned to the motherboards.

19. The chassis manager of claim 18, wherein the operations further comprise comparing a sum of the ranges of the electrical power assigned to the motherboards to a budgeted power.

20. The chassis manager of claim 19, wherein the operations further comprise activating an additional power supply unit of the power supply units in response to the sum of the ranges of the electrical power, the additional power supply unit for increasing the electrical power supplied to the motherboards.

* * * * *